Patented July 31, 1923.

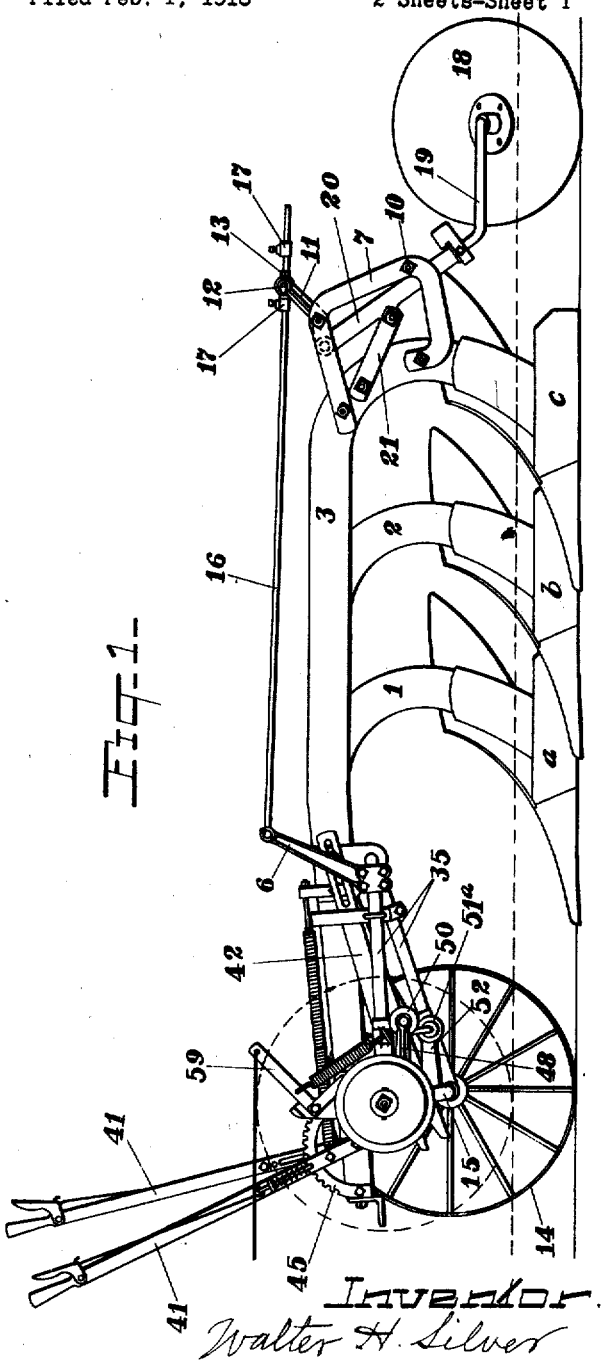

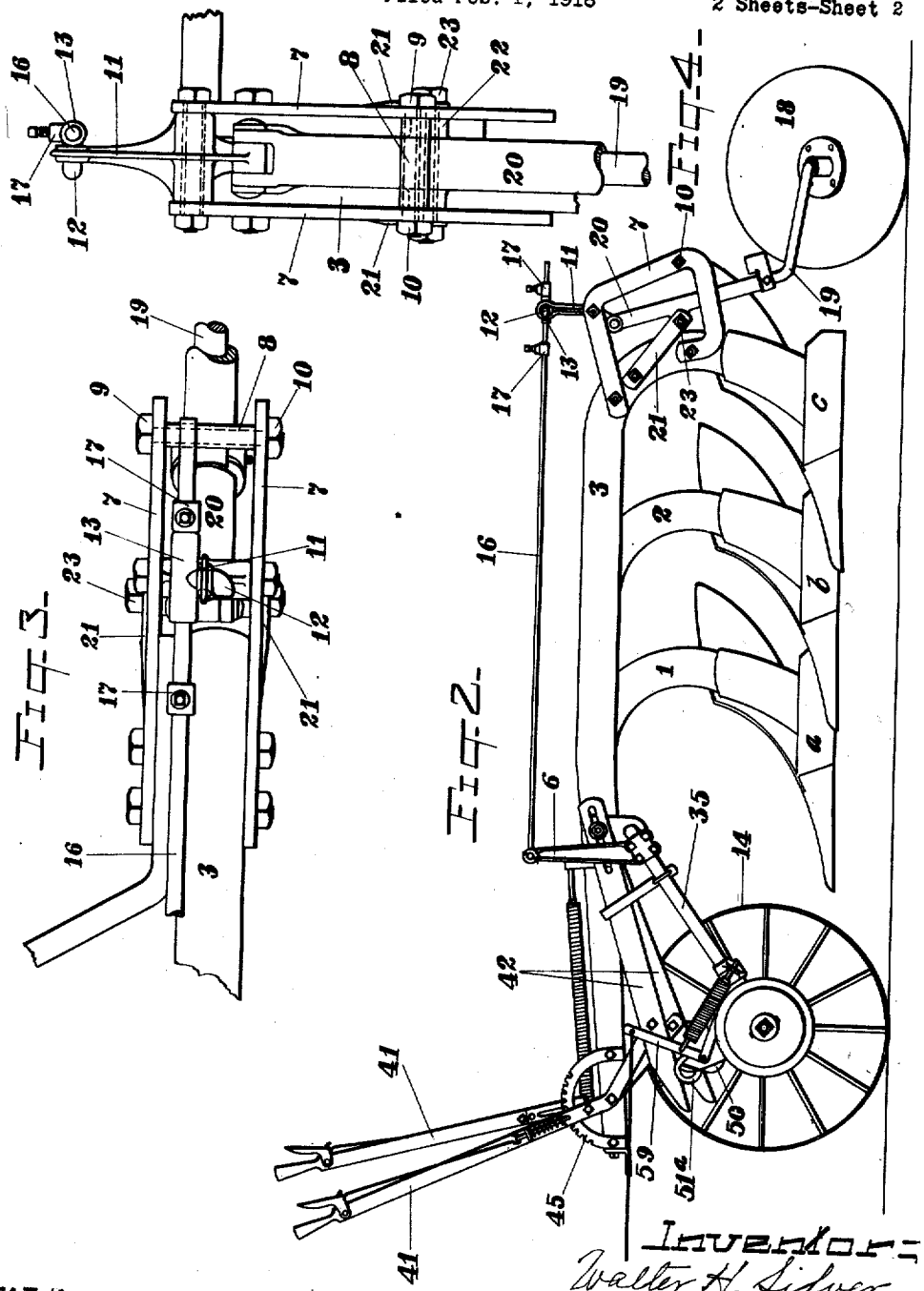

1,463,376

UNITED STATES PATENT OFFICE.

WALTER H. SILVER, OF MOLINE, ILLINOIS, ASSIGNOR TO DEERE & COMPANY, OF MOLINE, ILLINOIS, A CORPORATION OF ILLINOIS.

WHEEL PLOW.

Application filed February 1, 1918. Serial No. 214,926.

*To all whom it may concern:*

Be it known that I, WALTER H. SILVER, a citizen of the United States, residing at Moline, in the county of Rock Island and State of Illinois, have invented certain new and useful Improvements in Wheel Plows, of which the following is a specification, reference being had therein to the accompanying drawing.

My invention relates to wheeled plows, and more particularly to plows in which the power of the draft is employed to raise the plow from the ground, and the object of my invention is to provide a simple and effective means by which the rear of the plow is raised practically simultaneously with the forward part thereof, and to a greater height than is ordinarily the case with the mechanism commonly employed.

Referring to the drawings in which similar numerals indicate indentical parts—

Figure 1 is a side elevation of a gang plow, with the land wheel removed, embodying my invention and illustrating the position of the parts when the plow is at work. Figure 2 is a similar view showing the position of the parts when the plow is raised. Figure 3 is an enlarged detail plan of the rear wheel support, and Figure 4 is a rear elevation of Figure 3.

To illustrate the application of my invention I have shown it as part of a gang plow embodying, at the forward end thereof, a mechanism by which the front end of the plow is raised from the ground at will, which is the subject of an application of Carl G. Strandlund, filed January 15, 1915, Serial No. 2343, patented May 3, 1921, No. 1,376,787, to which reference is made for a full detail description thereof, and I have used the same numerals in my drawings as are found in the drawings of said application, for purposes of better reference, omitting a detailed description of the parts.

The plow beams 1, 2, and 3 are connected to a draft bar 13, and spaced apart by suitable braces not shown, and carry plows *a*, *b*, and *c*. The forward end of the plow is supported on an axle 15 having a furrow wheel 14 and a land wheel not shown. The axle is flexibly connected with the gang of plows in the following manner, bails 35 are pivotally connected to the axle 15 and to the beams 1, 2, and 3. Pivotally mounted forwardly on the beams 1 and 3 respectively are levers 41 having a portion of their length, below their pivots, bent at a rearward angle and pivotally attached to rearwardly extending bars 42; the forward ends of the bars 42 extend beyond the axle 15 and are in contact with the axle 15 except when the gang of plows is out of the ground and their rear ends are movably secured to the beams 1 and 3 respectively. Mounted on the beams 1 and 3, adjacent the levers thereon are segmental racks 45 with the teeth of which dogs of usual type on the levers 41 are adapted to engage to hold the levers 41 in any desired position of adjustment. Arms 48 and 52 are secured on a tubular member through which the axle 15 passes, and have their free ends connected by a rod on which are rollers 50 and 51ª normally in contact with the bars 42. A clutch mechanism is interposed between the landward end of the tubular member and the hub of the land wheel and is adapted to be thrown in operation by actuation of a lever 59, resulting in the arms 48 and 52 rotating upward and forward and consequently raising the front end of the plow, the rear end being raised by independent manually operated mechanism.

In my invention the rear end of the plow is raised practically simultaneously with the front end and by the same power, and to that end I mount rigidly, on the rear part of the landward bail 35, an upright arm or standard 6 which is rockable forward or back by the movement of the bail 35 to which it is secured.

Rigidly mounted on the rear of the plow, preferably on the plow beam 3, is a frame support composed of members 7 spaced apart rearwardly by a tubular member 8 through which, and through the members 7, a bolt 9 passes and is secured by a nut 10. A rocking lever 11 is pivotally mounted, intermediate its length, between the members 7 and is provided with an eye at its upper end to receive a hook 12, the latter being preferably integral with a sleeve 13 mounted on a rod 16 the forward end of which is connected to the arm 6. The sleeve 13 is loose upon the rod 16 and has an adjustable and limited amount of play thereon between adjustable stops 17 on the rod 16.

A rear furrow wheel 18 is mounted on a laterally extending portion of a crank axle 19 which is substantially horizontal for a portion of its length and is then bent upward at an angle to form a spindle which is journaled in a sleeve 20. The upper end of the sleeve 20 is bifurcated to receive the lower end of the rocking lever 11 to which it is pivotally secured. The lower portion of the rocking lever 11 extending at a forward angle from the pivot of the lever to its pivotal connection with the sleeve 20. On opposite sides of the rear portion of the beam 3 are pivotally mounted links 21 which extend rearwardly to the sleeve 20, the latter having a laterally extending bearing 22 intermediate its length to which the rear ends of the links are secured by a bolt 23 which passes through both links 21 and the bearing 22 and forms a pivot for the rear ends of the links 21 and the sleeve 20.

When the forward end of the plow is raised the movement of the landward bail 35 rocks the arm 6 forwardly and drawing forward the rod 16, until the rear stop 17 contacts with the sleeve 13 connected to the lever 11, the lever 11 is rocked forwardly and as it is pivoted intermediate its length on the members 7, and is fulcrumed on the upper end of the sleeve 20, the rear of the plow will be raised to the desired height.

Ordinarily the rear of the plow is raised by rocking the sleeve 20, as shown in the art, in my device however I combine with the sleeve 20, the lever 11, and while the operation of both in raising the plow is simultaneous, the plow is raised to a greater height than if raised only by rocking the sleeve 20, for to the latter operation I add an additional upward movement of the plow by rocking the lever 11, the additional upward movement being determined by the distance between the pivot of the lever and its pivotal connection with the sleeve 20, accomplishing in one operation the raising of the plow from the ground to a greater height than has heretofore been possible by actuation of the sleeve 20 only or a similar device, and without increasing the length of the sleeve and the spindle. The plane which includes the pivot axes of the links 21 is inclined downward and backward, and the sleeve, the links and the short arm of the lever 11 are so related in their positions that the lower end of the sleeve is drawn forward during the time when the upper end of the sleeve is being moved downward and backward by the power arm of the lever.

To lower the plow the operation of the parts is reversed for when the front of the plow is lowered the weight thereof will cause the lever 11 to swing rearwardly and the connected parts to resume their operative position shown in Figure 1. While I have shown my device applied to a power lift plow and operated by actuation of the power lift mechanism, it is evident that it will be equally effective if the lever 11 is manually operative and disconnected from mechanism by which the front of the plow can be raised and lowered.

What I claim is—

1. The combination with the plow beam, the bottom secured thereto, the rear furrow wheel, and the crank axle therefor having an upward extending spindle, of the sleeve for the spindle, the link pivoted to the sleeve and to the beam, and the vertically swinging power arm pivotally connected to the sleeve, said parts being arranged relatively to each other as described whereby the lower end of the spindle and the furrow wheel are forced forward relatively to the beam and to the upper end of the spindle when the lever commences to apply lifting power.

2. The combination of the vertically movable beam-frame and bottom, the horizontally vibratable rear furrow wheel having an axle with an upwardly extending spindle, the sleeve in which the spindle is mounted, and the lever having its power arm pivotally connected to the sleeve, of means connecting the sleeve to the beam for causing its lower end to swing forward relatively to its upper end during the entire lifting movement caused by the power arm.

3. The combination with the vertically adjustable beam-frame, the plow bottoms secured thereto, the rear furrow wheel bodily movable forward and backward relatively to the beam-frame and bottoms, the axle for said wheel having an upward inclined spindle, the sleeve in which said spindle is mounted, and the lifting lever having its power arm pivotally connected to the sleeve and adapted to move the latter bodily downward, of a link pivotally connected to the beam-frame and to the sleeve and arranged relatively to the aforesaid parts to cause the wheel and the lower part of the spindle to move forward relatively to the upper end of the spindle and toward the beam-frame and bottoms as soon as the power arm begins to bear downward on the sleeve.

4. The combination with the vertically movable beam-frame and bottoms, the rear furrow wheel, the axle therefor having an upward extending spindle, and the sleeve for the spindle, of the link pivoted to the beam-frame and to the sleeve and having the plane of its pivot axes inclined backward and downward both when the plow bottoms are in their lower position and when they are in their upper position, the lifting lever having its power arm shorter than the link and pivotally connected to the sleeve at an axis above the axis of the link, the sleeve the link and the lever having their axes related, as described, to cause the link to draw the wheel bodily forward relatively to the upper end of the spindle during the time when the lever is applying lifting power.

5. The combination with the vertically movable beam frame and bottoms, the rear furrow wheel, the axle therefor having an upwardly extending spindle, and the sleeve for the spindle, of the relatively long link pivoted to the beam-frame and to the sleeve and having the plane of its pivot axes inclined backward and downward when the plow beams are in their lower position, and the lifting lever pivotally mounted on the beam-frame and having a relatively short power arm pivotally connected to the upper end of the sleeve, said link and power arm being arranged to simultaneously move the lower end of the sleeve forward and the upper end backward when the lever commences to apply lifting power.

6. The combination with the vertically movable beam-frame and bottom, the rear furrow wheel, the supporting devices for the furrow wheel, comprising a bearing sleeve in which is mounted the wheel and the lower end of which can swing forward and backward relatively to the upper end, and devices connecting the bearing to the beam-frame, and a lever supported by the beam-frame for lifting said frame on the wheel, the connecting devices the bearing and the lever being adapted to move the wheel, bodily, forward with the lower end of the bearing sleeve relatively to its upper end as soon as the frame begins to rise.

WALTER H. SILVER.